United States Patent [19]

Farrar et al.

[11] Patent Number: 4,554,298

[45] Date of Patent: *Nov. 19, 1985

[54] WATER SOLUBLE POLYMERS

[75] Inventors: David Farrar, Bradford; Malcolm Hawe, Huddersfield, both of England

[73] Assignee: Allied Colloids Limited, England

[*] Notice: The portion of the term of this patent subsequent to Mar. 5, 2002 has been disclaimed.

[21] Appl. No.: 672,312

[22] Filed: Nov. 16, 1984

Related U.S. Application Data

[63] Continuation-in-part of Ser. No. 612,185, May 21, 1984, Pat. No. 4,503,172.

[30] Foreign Application Priority Data

May 20, 1983 [GB] United Kingdom ................. 8313976
Aug. 12, 1983 [GB] United Kingdom ................. 8321731

[51] Int. Cl.$^4$ ............................ C08F 6/04; C08F 6/10
[52] U.S. Cl. .................................... 523/336; 523/332; 523/337; 523/339; 524/814; 524/832

[58] Field of Search ............... 523/336, 332, 337, 339; 524/814, 832

[56] References Cited

U.S. PATENT DOCUMENTS 3,759,860  9/1973  Peaker .................................. 528/391
3,840,487 10/1974  Dyson et al. ......................... 524/394

FOREIGN PATENT DOCUMENTS

EP46573   3/1982  European Pat. Off. .
EP68887   1/1983  European Pat. Off. .
EP108842  5/1984  European Pat. Off. .

Primary Examiner—Ronald W. Griffin
Attorney, Agent, or Firm—Lawrence Rosen

[57] ABSTRACT

A water soluble polymer containing acid groups can be fractionated into higher and lower molecular weight fractions by partial neutralization of the polymer as a solution in a blend of water and a low molecular weight alcohol and separating the resultant aqueous and organic phases.

18 Claims, No Drawings

WATER SOLUBLE POLYMERS

This application is a continuation-in-part of our application Ser. No. 612,185 filed May 21, 1984, now U.S. Pat. No. 4,503,172.

It is standard practice to make water soluble acidic polymers, such as polyacrylic acid, by solution polymerisation in which event the solvent may be a blend of water and an organic liquid such as isopropanol. The product of the polymerisation is a solution of polymer together with some oligomer and unreacted monomer.

One process that we have used for removing the unwanted low molecular weight components, i.e. the oligomer and monomer, has involved adding sodium hydroxide to the solution so as to neutralise fully all the acidic groups, and allowing the mixture to separate into an upper isopropanol fraction containing the unwanted low molecular weight components and a lower aqueous fraction containing the desired polymer. This fractionation has been regarded merely as a way of separating the useful polymer from the unwanted by-products. The useful polymer is a blend of molecules of various molecular weights and in practice commercially available products generally have a polydispersity (PD) above 2 although some products may be lower, for instance 1.8. PD is the weight average molecular weight Mw divided by the number average molecular weight Mn.

A particular process for separating unwanted by-products is described in European Patent Publication 46573. In this it is said that the aqueous solution of polymer may be neutralised and various alkali metals and amines, for instance ethanolamine and other amines, are mentioned, and it is stated that the neutralised polymerisate may then be treated in the usual way with polar solvents, methanol, ethanol, propanol, isopropanol, acetone and tetrahydrofuran being mentioned. In the examples 80 grams fully neutralised sodium polyacrylate is fractionated in solution in 500 grams water with 400 grams methanol or 40 grams isopropanol. In each instance the lighter, organic, phase is rejected. This therefore seems to be a conventional fractionation to remove oligomers and the product would therefore be a conventional blend of molecular weights. If the starting polymer mixture is conventional the Mw, Mn and PD values of the extracted polymer will also be conventional, eg PD above 1.8.

The same patentees have published in their later British Patent Specification 2109363 a generally similar disclosure of treating the aqueous polymerisate with polar solvents except that no process details are given and in this example the organic fraction is said to be a useful product having a molecular weight distribution ranging between 400 and 1,200 and the aqueous fraction is said to have a molecular weight ranging between 1,200 and 12,000.

Whenever a water soluble acidic polymer is made it is generally used in the form of a fully neutralised salt although in some instances a partially neutralised salt or the free acid may be used. The polymer may be supplied to the user as a solution, for instance as a solution in which it was made initially, optionally after distilling any organic solvent from the solution, or the polymer may be separated from the solution, for instance by precipitation by the addition of an insolubilising material, such as excess acetone.

It is well recognised that minor variations in the polymerisation conditions used for making the polymer can greatly affect the activity of the product for any particular purpose, and so manufacturers exercise great care in optimising their process conditions to make a product that has optimum activity for its intended purpose.

It is known that the molecular weight of the polymer can make significant differences to the properties of the polymer (see for instance British Patent Specification Nos. 1414964 and 2109363) but it is also known to be very difficult to control the molecular weight accurately during polymerisation. Fractional precipitation of the polymer, for instance as described in British Patent Specification 1414964 is not commercially practicable as a way of producing selected molecular weight products on a commercial scale. Fractionation of a neutralised solution, for instance as described in the examples of European Patent Publication 46573, merely gives an uncontrolled fractionation between very low molecular weight products on the one hand and higher molecular weight products on the other.

It has been our object to devise a process by which a water soluble acidic polymer can be fractionated into higher and lower molecular weight fractions and in which the molecular weight in each fraction can be freely selected simply by appropriate selection of the fractionation conditions.

In the invention a solution is formed of a water soluble polymer containing acid groups in a blend of a polar solvent, water and base in an amount sufficient to neutralise at least 10% but not more than 90% molar of the said acid groups and the solvent, the base and the amount of base and/or the amount of solvent are selected to cause phase separation of the solution into an aqueous phase containing a higher molecular weight fraction and an organic phase containing a lower molecular weight fraction and subsequently both these fractions are used.

The precise split between the lower and higher molecular weight fractions can be selected by altering the process conditions, and in particular the degree of neutralisation, and so the method provides, for the first time, a simple process by which an acidic, water soluble, polymer can be fractionated into preselected molecular weight fractions. Unlike prior processes where the organic fraction is usually rejected, in the invention both fractions of polymer are commercially useful and so are recovered and used, the fraction in the organic phase being useful where lower molecular weights are desired and the fraction in the aqueous phase being useful where higher molecular weights are desired.

Additionally we have surprisingly found that the polymer in each fraction generally has at least one activity that is very much improved compared to the activity of the starting polymer. Often the polymer of one fraction has one type of greatly improved activity (for instance as a viscosifier) while the polymer in the other fraction may have a different type of greatly improved activity (for instance as a dispersant).

The polymer in each fraction will have lower polydispersity (weight average molecular weight divided by number average molecular weight) than the starting polymer. For instance the initial value is almost always above 1.6, and often is above 2, but the fractions obtained in the invention often have values of below 1.5, often 1.05 to 1.45 and most preferably 1.1 to 1.4.

Each of the polymer solutions can be used in the form in which it is obtained by phase separation, for instance simply by mixing the solution into the water or other liquor to be treated, or the polymer can be recovered from the solution by evaporation, precipitation or other conventional recovery techniques. The polymer in each of the separated solutions is generally in a partially neutralised state and can be acidified or fully neutralised in conventional manner if desired.

The process conditions that can be altered to affect the split between lower and higher molecular weight fractions include the choice of solvent, the choice of base, the amount of solvent and the amount of base. Once one has appreciated the novel concept that it is possible to fractionate usefully provided the acidic groups are partially neutralised, as opposed to full neutralisation in the prior art, it is possible to obtain any particular desired split or fractionation by appropriate selection of solvent, base, and amounts of each.

The particular solvent may have to be selected having regard to the nature of the polymer, and in particular its molecular weight. For instance the polar solvents are generally selected from $C_{1-5}$ alcohols and $C_{3-8}$ (generally $C_3$ or $C_4$) aliphatic ketones, most preferably isopropanol or acetone. Although the alcohols are very suitable for a wide range of polymers they are of particular value for the lower molecular weight polymers, molecular weight preferably below 100,000, most preferably below 300,000 and, especially, below 10,000. In contrast, the ketones are primarily of value for fractionating higher molecular weight polymers, for instance having average molecular weight above 50,000, generally above 100,000 and preferably above 200,000 or even 500,000.

In one preferred process of the invention a solution is formed in a blend of water and a polar solvent of a water soluble polymer containing neutralised acid groups and the solution is separated into an aqueous phase containing a higher molecular weight fraction of the polymer and an organic phase containing a lower molecular weight fraction of the polymer, and in this process the polar solvent is a $C_1$ to $C_5$ alcohol, the acid groups are neutralised with cations selected from sodium, potassium, lithium and ammonium and the molar proportion of neutralised acid groups is 10 to 55% when the cation is selected from sodium and potassium, 10 to 70% when the cation is ammonium and 30 to 90% when the cation is lithium.

The polymer can be any water soluble polymer containing acidic groups and may have been made by any suitable polymerisation technique. The polymer is generally obtained by polymerisation of an ethylenically or other unsaturated monomer that contains acid groups either alone or with other ethylenically unsaturated monomeric material. Oligomers formed from the corresponding monomers may be used in place of the monomers. The acid groups are generally carboxylic acid or sulphonic acid or sulphuric acid groups. The monomers are often acrylic monomers and therefore preferred acidic monomers include one or more acrylic acid, 2-acrylamido-2-methyl propane sulphonic acid (AMPS), 2-acrylamido-2-phenyl propane sulphonic acid, methacrylic acid, itaconic acid, crotonic acid, vinyl sulphonic acid, vinyl sulphuric acid, allyl sulphonic acid, maleic acid and fumaric acid, the preferred monomers being acrylic acid and AMPS. Any comonomers that can be copolymerised, in the amounts present, with the acidic monomer or monomers to form a water soluble polymer can be used and include monomers such as acrylamide, acrylonitrile and acrylic esters. Generally at least 50% by weight and often at least 80% by weight of the monomers from which the polymer is formed are acidic monomers. The polymer is generally a linear polymer.

Preferred polymers for use in the invention are polyacrylic acid homopolymers but other very valuable polymers that may be treated in the invention are acrylic acid copolymers, especially copolymers with 2-acrylamido-2-methyl propane sulphonic acid or its salts, methacrylic acid homopolymer, itaconic acid methacrylic acid copolymers, vinyl sulphonic acid homopolymer and allyl sulphonic acid homopolymer and polyvinyl sulphuric acid.

The average molecular weight of the polymer that is to be fractionated can vary widely provided the value is not so high that the polymer is insoluble or forms a solution that has such a high viscosity that it cannot be fractionated into two phases or that forms, upon fractionation, a phase that has such a high viscosity that it cannot conveniently be separated from the other phase. Generally the molecular weight is 500 to 1 million and the most valuable advantages are found when the average molecular weight is below 100,000, generally below 30,000 and especially between 1,000 and 10,000, for instance around 1,500 to 4,500.

The polymer may have been made by any conventional polymerisation process and may have then been isolated, for instance as a solid, from any liquid phase in which it was formed, and then redissolved in the aqueous organic solution containing base used in the invention. Generally however the process of the invention is conducted on a solution of the polymer obtained by solution polymerisation of the appropriate monomers. The preferred solution polymerisation medium is an aqueous solution containing appropriate initiators or other polymerisation promoters, for instance water soluble peroxides and persulphates, or redox catalysts or catalysts for photopolymerisation and will generally include an organic solvent, for instance as a molecular weight regulator. Other known molecular weight regulators (e.g. that provide terminal —COOH, —OH or $C_{1-3}$ alkyl groups) may be included in the solution if desired.

The solution polymerisation may be conducted in the presence of the amounts of solvent, base and water required for the fractionation provided the polymerisation is conducted with sufficient agitation to prevent separation during polymerisation, the polymerisation mixture then being allowed to stand to allow separation to occur. Generally however the polymerisation is conducted in the presence of amounts of solvent, base and water such that separation will not occur and these amounts are then adjusted after polymerisation to cause separation.

In one process the solution of polymer is made by polymerisation in a mixture of water and organic solvent and this organic solvent may serve as the organic liquid for use in the invention. Generally this solvent should be fully miscible with the aqueous polymer solution, e.g. an alcohol or acetone. A very common solvent in solution polymerisations is isopropanol and blends of water and isopropanol are often very suitable in the invention. When polymerisation is conducted in the presence of the chosen solvent fractionation can then be brought about by appropriate adjustment of the amount of cation in the solution. With many monomers the polymerisation is generally conducted on the free acid form of the monomers in which event the base adjustment is effected by adding the appropriate amount of alkali or other source of cation. If the polymerisation is carried out on a wholly neutralised form of monomer (e.g. in the polymerisation of sodium vinyl sulphate) then the cation adjustment can be brought about by adding sufficient free acid to partially acidify the neutralised groups, thereby forming a polymer having the desired degree of neutralised groups. The free acid must be sufficiently strong to acidify the neutralised polymer acid groups. Often it is a mineral acid such as hydrochloric or sulphuric acid. The free acid may be the free acid form of the acidic polymer or it may be a water insoluble acidic polymer, preferably an anionic (generally sulphonic or strong acid) ion exchange resin.

In another process the polymerisation is conducted in the presence of base in an amount sufficient to neutralise 10 to 90% of the acid groups and then the phase separation is caused by adding the polar solvent in the required amount. If the amount of cation in the polymerisation mixture is not the optimum for the phase separation then additional base (or acid) may be added with the polar solvent to achieve the desired degree of neutralisation.

Irrespective of whether the solution is made by blending preformed polymer, water, organic solvent and base or by adding base to the reaction product of polymerisation in aqueous organic liquid, or in any other manner, the process of the invention requires that phase separation should be brought about between aqueous and organic phase in the presence of the specified solvents and the required amounts of the cations.

The bases are preferably basic compounds of nomovalent cations such as sodium, potassium, lithium and ammonium, preferably in the amounts quoted above since in general we find that with most solvents amounts outside these ranges give less satisfactory fractionation. Lower alkyl amines (e.g. ethylamine) may be suitable for some polymers, as may basic compounds of multivalent cations (provided the amount and type of cations does not result in precipitation of the polymer). Suitable multivalent cations include Ca, Zn, Cu, Mg and Al. The basic compounds may be, for example, oxides, hydroxides, carbonates, bicarbonates, alkoxides, phosphates, hydrogen phosphates, phosphonates, polyphosphates or organic carboxylic salts where the organic acid is weaker than the polymeric acid, e.g. sodium acetate, adipate or citrate when the polymeric acid is a sulphuric or sulphonic acid.

The degree of neutralisation of the acid groups controls the fractionation. The results obtained in any particular process will depend upon, inter alia, the concentrations, the polymer type and the solvent but there is a minimum degree of neutralisation below which substantially no fractionation occurs and the system may instead remain as a homogeneous solution. When the cation of the base is sodium, potassium or lithium the degree of neutralisation will normally be at least 10%, often at least 15% and preferably at least 25% whilst if the cation is lithium the degree of neutralisation will normally have to be at least about 30%, preferably at least 40% and generally at least 50%. If the degree of neutralisation is too high the size of the lower molecular weight fraction is unacceptably low. When the cation of the base is sodium or potassium the degree of neutralisation will normally be below 55%, preferably below 50% and most preferably below 40%. When the cation of the base is ammonium the degree of neutralisation will normally be below 70%, preferably below 60% and most preferably below 50%. When the cation of the base is lithium the degree of neutralisation will normally be below 90%, and preferably below 70%.

In any particular process the size of, for instance, the higher molecular weight fraction can be increased (with consequential reduction in its average molecular weight and consequential reduction in the size and the average molecular weight of the lower molecular weight fraction) by increasing the amount of base and conversely the size of the low molecular weight fractions can be increased by reducing the amount of base.

The process conditions are usually selected such that each fraction contains from about 10 to 90%, preferably about 20 to 80%, and most preferably 30 to 70%, by weight of the starting polymer.

The partial neutralisation of the acidic polymer is normally achieved by adding a hydroxide or other base that will provide the chosen cation in the selected amount to the dissolved polymer. Mixtures of two or more cations may be utilized, in which event the proportions will be selected such that they have the same effect as suitable amounts of the individual cations.

For any particular polymer, the degree of fractionation is dependent not only on the degree of neutralisation and the type of cation but also upon the concentration of the polymer and the choice and amount of the alcohol or other solvent. The alcohol is preferably isopropanol but propanol and other alcohols, especially $C_2$ to $C_5$ alchohols, may be used. The proportion water:alcohol or other solvent by weight is preferably from 1:0.2 to 1:5, most preferably 1:0.5 to 1:2 with best results generally being achieved, especially when the solvent is isopropanol and the cation is sodium, when the proportion is about 1:1. The proportions should be selected such that, having regard to the degree and nature of neutralisation, each of the phases will have a polymer concentration of at least 5%, generally at least 10% and preferably at least 15% by weight of the phase.

The amount of the polymer (measured as the acid polymer) is normally at least 5% by weight based on the weight of polymer, solvent and water (including water introduced with the alkali) and preferaby is at least 10%. The concentration must not be so high that the system is so viscous that mixing and phase separation is significantly impeded and so is generally below 30%. Preferably the concentration is 15 to 25% by weight.

The phase separation may also be affected by the temperature at which the process is conducted. This may be between 15° and 80° C. but preferably is between 30° and 70° C.

The process may be conducted by combining the essential components of the solution in any convenient manner, for instance by adding aqueous alkali to the aqueous organic reaction product obtained by polymerisation of the monomer or monomers in aqueous organic solution. The process may be conducted continuously or batchwise. Depending upon the degree of neutralisation, and type and strength of base, the concentration of the polymer, the amount of solvent and the temperature the phase separation may occur rapidly or slowly. For instance it may occur substantially instantaneously or it may be necessary to leave the system to stand for periods of, for instance, 5 minutes to 2 hours, typically 30 minutes to 1 hour. The separation may be conducted batchwise or continuously, with the mix being fed through a conventional separation column or separation reactor.

The two phases are kept separate, may be fully neutralised with the same or different alkali and organic solvent may be stripped from the organic phase by distillation.

Each of the polymer fractions is recovered for subsequent commercial use. The polymers may be used, for instance, as sand grinding aids for marble grinding, pigment dispersants, paint additives, viscosifiers or antiscalants.

The following are some examples of the invention.

EXAMPLE 1

A 23% by weight solution of polyacrylic acid in a blend of equal parts by weight isopropanol and water was prepared by polymerisation of acrylic acid using ammonium persulphate as initiator, in conventional manner. Samples of the products were extracted while other samples were neutralised by the addition of varying amounts of sodium hydroxide, introduced as a 46% by weight aqueous solution. Each of the samples, after the addition of sodium hydroxide, was allowed to stand for sufficient time for an aqueous phase to separate from an organic phase (that probably contained some water) and these phases were then separated from one another in conventional manner. Each phase was then fully neutralised with sodium hydroxide and the residual alcohol was removed by distillation.

The yield of polymer in each of the phases was recorded. The products were adjusted to 40% active solids and compared as marble grinding aids as described in Example 11 of British Patent Specification No. 1,414,964. The results are set out in Table 1.

TABLE 1

| Percent | Yield Percent | | Aqueous Layer |
|---|---|---|---|
| Neutralisation | Organic | Aqueous | Milling index |
| 10 | 87.2 | 12.8 | — |
| 15 | 79.3 | 20.7 | — |
| 25 | 23.1 | 76.9 | 1.94 |
| 50 | 4.0 | 96.0 | 2.33 |
| 75 | 0.7 | 99.3 | 1.22 |
| 100 | 0.5 | 99.5 | 0.37 |

In the described test a milling index value of around 0.5 is generally satisfactory as it indicates commercially acceptable properties for preventing gelation of the marble dispersion.

It is apparent from the table that after full neutralisation almost all the polymer is in the aqueous phase but that substantial amounts of polymer go into the organic phase at low degrees of neutralisation. It is also very notable that the milling index is greatly improved even when the amount of polymer that is in the organic phase, instead of the aqueous phase, is quite low. For instance at 50% neutralisation the amount of polymer in the organic phase is low but the milling index is about 5 times what would be considered to be commercially adequate. At higher degrees of neutralisation only a very low amount of polymer goes into the organic phase.

EXAMPLE 2

The polymer prepared by conventional neutralisation and distillation and the polymers obtained in Example 1 in the organic phase and in the aqueous phase at 25% neutralisation were all tested as dispersants in 64% by weight china clay dispersions at dosages of 0.12, 0.14, 0.16 and 0.18. The viscosity was recorded. The values are set out in Table 2.

TABLE 2

| Product | Viscosity at Dosage (D/D) | | | | |
|---|---|---|---|---|---|
| | 0.1 | 0.12 | 0.14 | 0.16 | 0.18 |
| Conventional | — | 404 | 248 | 222 | 220 |
| 25% neutralisation organic layer | 254 | 288 | 230 | 214 | 218 |
| 25% neutralisation aqueous layer | — | 396 | 298 | 274 | 284 |

From this it can be seen that the process of the invention results in the production of fractions having very different dispersing properties and, in particular, that the product in the organic layer is capable of giving a suitable low viscosity at a much lower dosage (0.1) than the dosage required to give a similar viscosity using the starting polymer (0.14).

EXAMPLE 3

In this case a polymer prepared by conventional polymerisation techniques as a 23% solution of acrylic acid in equal amounts of isopropanol and water was neutralised to 25% with aqueous ammonia solution after polymerisation. This caused the reaction mixture to separate into two phases. These were separated and the polymer present in each phase was recovered after removal of the isopropanol by distillation. The samples were then completely neutralised with aqueous ammonia solution. The active content was determined by potentiometric titration and the products were adjusted to 40% active as ammonium polyacrylate.

The products were then evaluated as dispersants for china clay at 64% w/w slurry solids content, in comparison with a sample of the polymerisation mixture which had been prepared by neutralisation and distillation in the conventional manner.

The results obtained are given in Table 3.

TABLE 3

| % Neutralisation | % Yield | | Mw | Mn | (Mw)/(Mn) | Slurry viscosity (cP) at given dispersant dose (% DOD) | | | | | | | |
|---|---|---|---|---|---|---|---|---|---|---|---|---|---|
| | Aqueous | Organic | | | | 0.10 | 0.12 | 0.14 | 0.16 | 0.18 | 0.20 | 0.22 | 0.24 |
| 100 | 100 | — | 3204 | 1883 | 1.70 | 1292 | 438 | 238 | 226 | 214 | 216 | 228 | 236 |
| 25 | 55.5 | — | 4025 | 3099 | 1.30 | — | 524 | 260 | 240 | 230 | 230 | 242 | 272 |
| 25 | — | 44.5 | 1689 | 1256 | 1.35 | 358 | 196 | 184 | 180 | 178 | 184 | 188 | 200 |

Examination of gel permeation chromatograms of these products indicates clearly the partition of polymer which takes place between the two phases.

EXAMPLE 4

A copolymer comprising 80 parts acrylic acid, 20 parts 2-acrylamido-2-methyl propane sulphonic acid was prepared as a solution polymer in a mixture of isopropanol and water using conventional polymerisation techniques. After polymerisation, the reaction mixture was divided into two halves. The first half was treated with aqueous sodium hydroxide to give a product which was 100% neutralised, isopropanol was then removed by distillation.

The second half of the polymerisation mixture was treated with sufficient aqueous sodium hydroxide to neutralise the polymer to 25% and the mixture was allowed to separate into two layers. These were then separated from each other and fully neutralised after removal of isopropanol by distillation. The three products were then evaluated as marble grinding aids according to the method used in Example 1. The results obtained are given in Table 4.

TABLE 4

| Percent Neutralisation | Percent Yield Aqueous | Percent Yield Organic | Milling index of polymer |
|---|---|---|---|
| 100 | 100 | — | 0.74 |
| 25 | — | 47.5 | 1.45 |
| 25 | 52.5 | — | 3.64 |

These results show that both polymers are more effective than the starting polymer. This occurs because of the narrower molecular weight distribution of polymers subject to this type of procedure.

EXAMPLE 5

A 20% solution of polyacrylic acid having Mw of 3131 and PD (polydispersity) of 1.677 was dissolved in 50/50 w/w isopropanol/water was neutralised with various basic compounds and the two layers separated. The amount and molecular weight of the polymer in each layer was determined. The results are shown in Table 5.

TABLE 5

| Base | % Neutralisation | Aqueous layer % Extracted | Aqueous layer Mw | Aqueous layer P.D. | Organic layer % Extracted | Organic layer Mw | Organic layer P.D. |
|---|---|---|---|---|---|---|---|
| NaOH | 25 | 75.2 | 3833 | 1.30 | 24.8 | 1452 | 1.402 |
| NH4OH | 25 | 55.6 | 4025 | 1.30 | 44.4 | 1689 | 1.34 |
| LiOH | 25 | NO SEPARATION | | | | | |
| LiOH | 50 | 50.2 | 3957 | 1.427 | 49.8 | 1783 | 1.44 |
| KOH | 25 | 63.5 | 3649 | 1.56 | 36.5 | 1402 | 1.49 |
| NaOH | 15 | 20.6 | 3976 | 1.49 | 79.4 | 2027 | 1.63 |
| NaOH | 50 | 95.7 | 3688 | 1.51 | 4.3 | Very low | |
| NaOH | 75 | 99.3 | 3376 | 1.53 | 0.7 | Very low | |

EXAMPLE 6

Using the same polyacrylic acid solution from example 5 the system was neutralised with sodium hydroxide to 25% theoretical at a variety of temperatures. The results are shown in Table 6.

TABLE 6

| Temp. °C. | AQUEOUS LAYER Yield (%) | AQUEOUS LAYER Mw | AQUEOUS LAYER P.D. | ORGANIC LAYER Yield (%) | ORGANIC LAYER Mw | ORGANIC LAYER P.D. |
|---|---|---|---|---|---|---|
| 20 | 71 | 3977 | 1.42 | 29 | 1221 | 1.35 |
| 40 | 69 | 3803 | 1.33 | 31 | 1234 | 1.38 |
| 60 | 72 | 3634 | 1.39 | 28 | 1258 | 1.34 |
| 80 | 74 | 3936 | 1.42 | 26 | 1153 | 1.32 |

The results show the partition of the polymer and the average molecular weight is independent of temperature. However, the speed of phase disengagement increased with temperature.

EXAMPLE 7

Other polymers are prepared by the general technique described in Example 1 but using different monomers. When the monomer consisted solely of methacrylic acid 25% neutralisation with sodium hydroxide fractionated the product into a lower molecular weight isopropanol phase that was useful as a dispersant for china clay and a higher molecular weight aqueous phase.

When the monomer consists of equal parts by weight itaconic acid and methacrylic acid 25% neutralisation with sodium hydroxide results in fractionation into a higher molecular weight aqueous phase and a lower molecular weight isopropanol phase.

When the monomer consisted of sodium vinyl sulphonate the initial polymer is in the sodium form and this can be part neutralised by acidic ion exchange resin and then fractionated using isopropanol.

EXAMPLE 8

A solution of acrylic acid monomer containing sufficient sodium hydroxide to neutralise 25% of the acrylic acid groups was polymerised by thermally initiated polymerisation in isopropanol. The product fractionated into organic and aqueous phases containing, respectively, 8.9 and 91.1% by weight of the polymer. When the process was repeated 20% neutralisation and with 15% neutralisation the organic and aqueous phases fractionated with polymer contents as shown in Table 7.

TABLE 7

| % Neutralisation | % of Polymer | Mw | Mu | PD |
|---|---|---|---|---|
| 20 | 32 - organic | 1284 | 1012 | 1.27 |
| | 68 - aqueous | 3616 | 2515 | 1.44 |
| 15 | 44.6 - organic | 2268 | 1620 | 1.40 |
| | 56.4 - aqueous | 4447 | 3245 | 1.37 |

EXAMPLE 9

The process of Example 8 was repeated except that the solvent that was added was acetone and the degree of neutralisation 20%. The aqueous and organic phases respectively contained 49.1 and 50.9% by weight of the polymer and the polymer in each phase had an intrinsic viscosity of 0.919 dl/g (aqueous phase) and 0.652 dl/g (organic phase). The aqueous phase was tending towards a gel.

When the process was repeated with methanol and 25% neutralisation the aqueous and organic phases respectively contained 57.8 and 42.2% by weight of the polymer and the polymer in each phase had an intrinsic viscosity of 0.423 dl/g (aqueous phase) and 0.32 dl/g (organic phase).

We claim:

1. A process in which a solution is formed of a water soluble polymer containing acid groups in a blend of a polar solvent, water and base in an amount sufficient to neutralise at least 10% but not more than 90% molar of the said acid groups and in which the solvent, the base and the amount of at least one of the base and the solvent are selected to cause phase separation of the solution into an aqueous phase containing a higher molecular weight fraction and an organic phase containing a lower molecular weight fraction.

2. A process according to claim 1 in which the polar solvent is a $C_{1-5}$ alcohol.

3. A process according to claim 1 in which the cation is selected from sodium, potassium, lithium and ammonium and the molar proportions of neutralised groups are 10 to 55% when the base is a compound containing a cation selected from sodium and potassium, 10 to 70% when the base is a compound containing ammonium and 30 to 90% when the base is a compound containing lithium.

4. A process in which a solution in a blend of water and a polar solvent of a water soluble polymer containing neutralised acid groups is separated into an aqueous phase containing a higher molecular weight fraction and an organic phase containing a lower molecular weight fraction characterised in that the polar solvent is a $C_1$ to $C_5$ alcohol, the acid groups are neutralised with a base containing a cation selected from sodium, potassium, lithium or ammonium and the molar proportion of neutralised groups is from 10 to 55% when the cation is selected from sodium and potassium, 10 to 70% when the cation is ammonium and 30 to 90% when the cation is lithium.

5. A process according to claim 4 in which the alcohol is isopropanol.

6. A process according to claim 4 in which the alcohol is isopropanol and the proportion water:alcohol is from 1:0.5 to 1:2.

7. A process according to any preceding claim in which the concentration of polymer (by weight of the acid polymer based on polymer, water and solvent) is at least 10%, and each phase contains from 20 to 80% by weight of the polymer.

8. A process according to claim 4 in which the concentration of polymer in the blend is from 15 to 25%, and in which each phase contains from 30 to 70% by weight of the polymer.

9. A process according to claim 1 in which the base is a compound including a cation that is selected from sodium and potassium and the proportion of neutralised groups is from 15 to 40% or the cation is ammonium and the proportion of neutralised groups is from 15 to 50%.

10. A process according to claim 1 in which the blend is a blend of 1 part water to 0.5 to 2 parts isopropanol, the polymer is present in a concentration of 10 to 30% by weight of the blend, the polymer is a polymer formed from monomers comprising acidic monomers selected from acrylic acid and 2-acrylamido-2-methyl propane sulphonic acid, and from 10 to 50% by weight of the acid groups are present as a salt with sodium, the remainder of the acid groups being free acid groups.

11. A process according to claim 1 in which either or both of the polymer fractions has a polydispersity of from about 1.05 to about 1.45 and in which both fractions have a polydispersity below 1.5.

12. A process according to claim 4 in which the molecular weight of the polymer is below about 100,000.

13. A process according to claim 1 in which the polar solvent is a $C_{3-8}$ aliphatic ketone and the polymer has a molecular weight above 50,000.

14. A process according to claim 1 in which the solvent is acetone and the polymer has a molecular weight above 100,000.

15. A process according to claim 1 comprising the preliminary step of forming the solution in the blend by polymerising water soluble acidic monomer in the blend and then adding sufficient base to partially neutralise the polymer.

16. A process according to claim 1 comprising the preliminary step of forming an aqueous solution of water soluble polymer by aqueous solution polymerisation of polymerisable monomers including acidic monomers in the presence of cation in an amount sufficient to neutralise from 10 to 90% of the acid groups and then adding the polar solvent.

17. A process according to claim 1 in which the acidic polymer is a polymer obtained by polymerising monomers selected from acrylic acid and 2-acrylamido-2-methyl propane sulphonic acid.

18. A process according to claim 1 in which the acidic polymer is a polymer obtained by polymerising monomers selected from acrylic acid, 2-acrylamido-2-methyl propane sulphonic acid, 2-acrylamido-2-phenyl propane sulphonic acid, methacrylic acid, itaconic acid, vinyl sulphonic acid, vinyl sulphuric acid, allyl sulphonic acid, maleic acid, fumaric acid and crotonic acid.

* * * * *